Patented Aug. 8, 1939

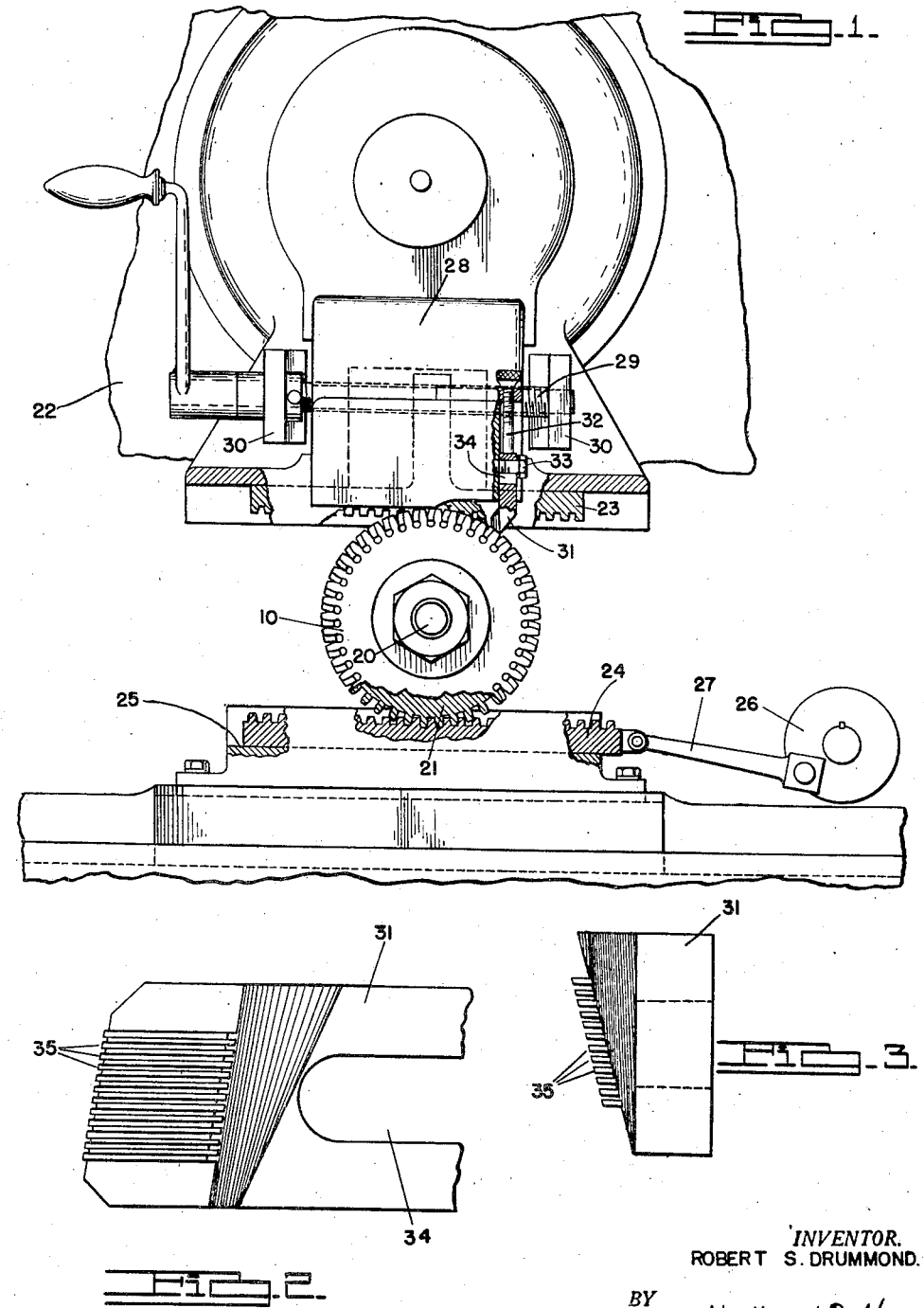

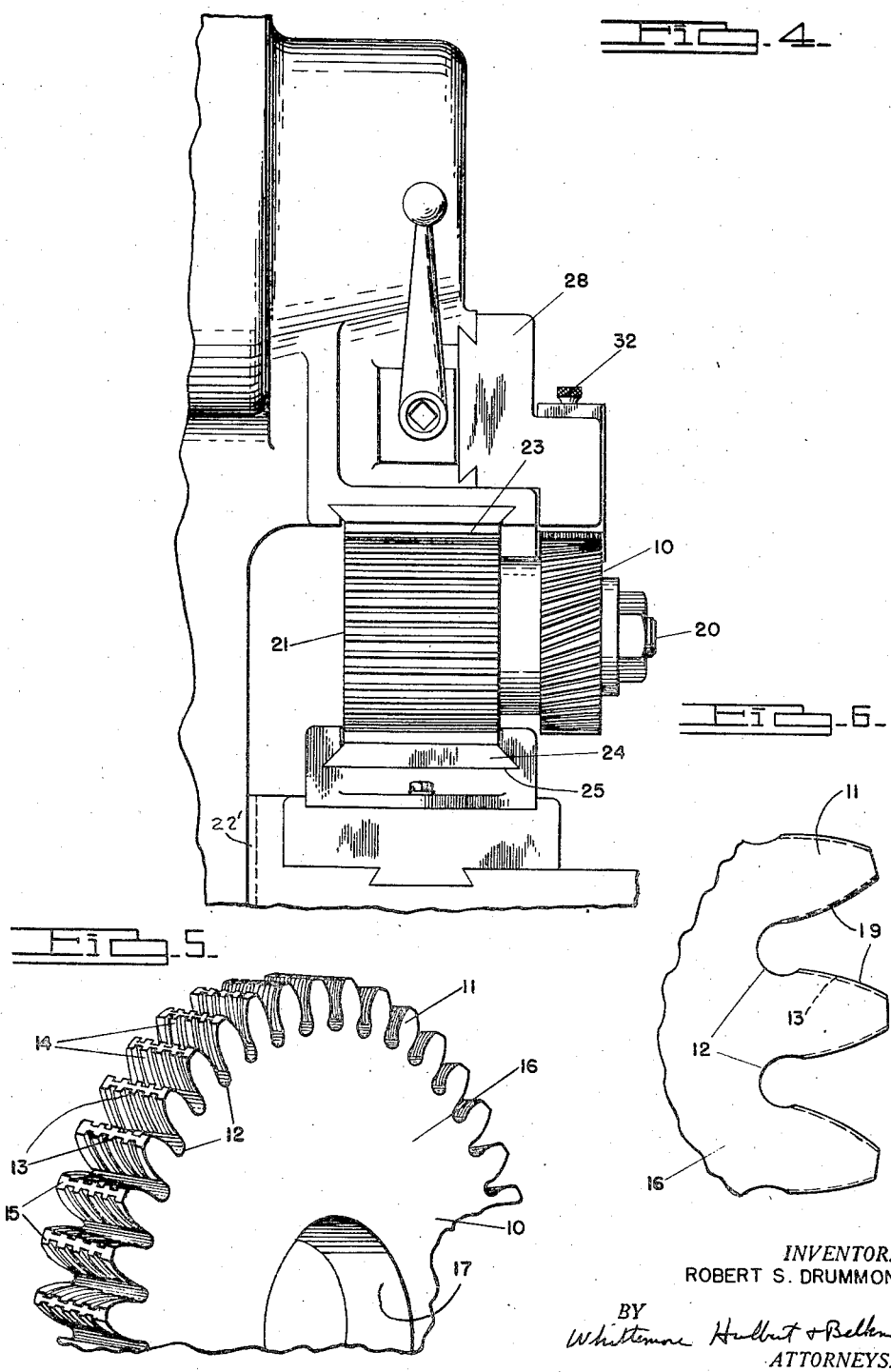

2,168,932

UNITED STATES PATENT OFFICE 2,168,932

GEAR-CUTTING MACHINE

Robert S. Drummond, Detroit, Mich.

Original application February 8, 1937, Serial No. 124,791. Divided and this application July 26, 1937, Serial No. 155,813

14 Claims. (Cl. 90—24)

This invention relates to a machine for serrating the faces of the teeth of rotary gear cutting tools, and is a division of my co-pending application for Patent Serial No. 124,791, filed February 8, 1937.

It is an object of the invention to provide a serrating machine in which the serrating tool is maintained stationary and the gear to be cut is moved relative thereto with a rolling generating motion.

It is a further object of the invention to provide a serrating machine in which the gear to be serrated is mounted on a cylinder which is rolled without slippage relative to a plane surface.

It is a further object of the invention to impart a rolling, generating motion to a gear-shaped member by meshing a second gear between a fixed and a movable rack and reciprocating the movable rack parallel to its axis.

It is a further object of the invention to provide a serrating machine in which the gear member to be serrated is rolled back and forth relative to a tool, and in which the tool is given a feeding movement parallel to the direction of roll of said gear member.

It is a further object of the invention to provide a serrating machine in which a gear member to be serrated is rolled back and forth in a plane and in which a tool is positioned nearer to the path of the axis of said gear member than the trace of the base circle of the gear member, whereby the tool may take cuts on the teeth of the gear member below the base circle thereof.

Other objects will be apparent as this description proceeds and especially when taken in conjunction with the accompanying drawings, in which Fig. 1 is an elevation partly in section of a machine for serrating the sides of the cutter teeth;

Fig. 2 is a fragmentary face view of the serrating tool;

Fig. 3 is an end view of a serrating tool;

Fig. 4 is a fragmentary side view of the machine shown in Fig. 1;

Fig. 5 is a fragmentary perspective view of a rotary gear cutter made in accordance with my invention;

Fig. 6 is a fragmentary face view of the rotary gear cutter.

A rotary gear cutting tool is shown in Figs. 5 and 6. This cutting tool is designated by the reference character 10 and is preferably formed from a forged high speed steel blank. The gear teeth 11 are preferably helical but in some instances may be of the spur type. A series of transversely extending cylindrical holes 12 are arranged at the roots of the teeth forming cylindrical relief slots. The sides of the gear teeth are provided with a series of serrations 13 extending from the tops of the teeth to the cylindrical relief slots 12. The serrations are closely spaced to form intermediate lands 14 of approximately the same width as the width of the serrations. In one desirable form of tool the width of the serrations and lands are each .035 inch and the depth of the serrations is also .035 inch. Preferably the lands 15 adjacent the end faces 16 are greater in width than the intermediate lands 14. This is for the purpose of providing additional strength for these end lands which are subjected to greater strain in operation. In the finished cutting tool the side faces 16 are ground to accurate parallelism while the side faces 19 of the gear teeth are accurately ground to the exact profile desired. This profile is generally of involute curvature but may be modified therefrom as desired.

In the preferred method of making the above described rotary gear cutting tool, I first obtain a blank of high speed steel forged for condensation of grain, and carefully anneal the same. The blank must have no surface defects, seams or other objectionable flaws. The blank is slightly larger than the final dimensions of the gear cutter in order that it may be machined on all surfaces. The gear teeth are preferably formed in the blank by a hobbing process leaving sufficient excess metal for the final profiling of the tooth curves. After the teeth are hobbed, the cylindrical relief slots 12 are drilled or otherwise formed, and these holes are of sufficient diameter so that the cutting tool used in the serrating machine hereinafter described will run out into the clear when traversing from the top to the root of the teeth. In the rotary cutting tool herein described cutting edges are provided on the faces of the teeth. These cutting edges are formed by the operation of serrating performed on my serration machine. These serrations may be parallel sided grooves extending from the top to the bottom of the teeth or they may be inwardly tapered grooves. In either case, however, the side faces of the grooves intersect the surface of the teeth in sharp cutting edges. Referring to Figs. 1 to 4, the tool blank 10 is accurately centered on and secured to a shaft 20 by suitable clamping means. The shaft 20 is rigidly connected to a gear member 21. The gear member 21 is of considerable axial extent so that in operation when it is meshed with the cooperating rack members, to be later described, it forms a firm guiding means for the tool blank.

The improved serrating machine has a frame to which is rigidly secured a rack member 23. Opposite the rack member 23 is provided a member having ways 25 therein in which is mounted for translation a second rack 24. Both the rack 23 and the rack 24 have teeth conjugate to the gear 21 and the gear 21 is received in tight mesh between the two rack members. Suitable means such as an eccentric 26 and a connecting rod 27 are provided to reciprocate the rack 24 in a direction parallel to its axis. Since the rack 23 is fixed and since the gear 21 is in mesh with both the fixed rack 23 and the movable rack 24, it will be apparent that translation of the movable rack 24 will cause the gear to roll relative to the fixed rack 23. This rolling motion between the gear 21 and the fixed rack 23 is of course equivalent to rolling a cylinder relative to a plane, the teeth on these two members merely prevent slippage therebetween. Since the gear blank 10 is coaxial with and fixed relative to the gear 21, a rolling, generating motion will be imparted thereto. This rolling generating motion is of such character that a fixed tool may generate an involute curve on the teeth of said tool blank 10.

Suitable means are provided for substituting gears 21 of various sizes in order to generate involute curves on the teeth of the tool blank 10 from various base circles. For this purpose the lower rack 24 is mounted in suitable ways 25 on a part which is vertically adjustable on the frame of the machine. For this vertical adjustment suitable vertical ways 22a are provided on the frame of the machine.

Mounted on the base 22 above the two racks and slidably adjustable with respect to the base is a carriage 28. Adjustment of the carriage is effected by a lead screw 29 journaled in brackets 30 and having a threaded connection with the carriage. The cutting tool 31 is secured to the carriage and is adjustable vertically thereon, an adjusting screw 32 being provided for this purpose. The tool is fixed in its adjusted position by means of a screw 33 disposed within an elongated slot 34 in the tool. This arrangement provides for adjusting the position of the tool vertically so that the cutting edge may be brought closer or farther away from the path of the axis of the tool blank 10. Therefore as the tool 31 is sharpened back it may be fed downwardly to keep the cutting edge in the same position relative to the tool blank. Also, the cutting edge of the tool 31 may be fed downwardly so that it is closer to the path of the axis of the tool blank than the radius of the base circle. The result of this is that the tool 31 may be used to cut below the base circle on the tool blank 10. In the latter case as will be obvious it is sometimes necessary to limit reciprocation of the rack 24 and hence motion of the tool blank 10 so that the axis of the tool blank 10 never moves to the right in Fig. 1 as far as the tool 31. In this last case, the curvature generated by the tool 31 will not be an involute generated from the base circle of the gear. It is not necessary, or particularly desirable that it should be of such involute curvature. In my improved serrating machine it is necessary only that the serrations be of sufficient depth to permit repeated regrinding, and slight variations in the depth of serration are of no significance.

The particular type of tool employed for cutting the serrations 13 in the teeth of the tool blank comprises a generally rectangular block of tool steel. Adjacent an end of the block the tool is provided with a series of projecting ribs 35 forming cutting members. These ribs are dimensioned to make the proper cut necessary to produce serrations and lands in the teeth as desired. If the gear finishing tool is to be one having straight spur teeth, the ribs on the cutting tool will of course be parallel to the axis of the finishing tool, but if the tool blank is provided with helical teeth, the lower end of the block is distorted at an angle corresponding with the angle of the helical teeth. The latter form of cutting tool is illustrated in Figs 2 and 3. If the tool blank is given a rolling motion relative to the rack 23, the cutting edges of the tool 31 may be positioned to correspond to an element of the stationary basic rack. Consequently, these edges will cut a series of involute gashes in the sides of the tool teeth. Preferably, however, by positioning the cutter 31 downwardly, gashes may be formed which depart from the involute curvature of the cutter and which are cut below the base circle. The cutter is advanced progressively parallel to the axis of the racks to make a number of cuts until the serrations have been cut to the desired depth. The finishing tool can then be reversed to form a like cutting operation of the other sides of the teeth.

It is to be noted that the cylindrical relief slots 12 at the base of the teeth permit the tool 31 to take a cut through the metal of the teeth of the tool blank and to finish a cut with the cutting edges thereof in the clear. By this means the gashes or serrations are made of substantially uniform depth over the entire tooth. This is highly advantageous insofar as regrinding the finishing gear cutting tool is concerned, because it is evident that regardless of the number of regrinds, the remaining depth of serration will always be constant and the serrations will always open into the relief slots.

In addition to the adjustment rendered possible by adjustability of the tool, a further adjustment is possible which is advantageous for several reasons. By selecting a base roll in the form of a gear member 21 which is of a diameter different from that which would give an involute generated from the same base circle as that on the tool, it is possible to cut serrations of gradually varying depth from tip to root. This is desirable and even necessary in some cases. For example, in the manufacture of cutters having teeth of very fine pitch, it is sometimes necessary to deduce the depth of serration adjacent the root of the tooth in order to preserve a sufficient working strength for the tooth. It is also desirable to introduce serrations of varying width in some cases due to the fact that in regrinding different amounts of metal are removed from the tip and root of the teeth. In such case it is desirable to provide a serration of greater depth at that part of the tooth from which more metal is removed on resharpening.

While I have illustrated a cutting tool which is adapted to cut serrations on the face of gear teeth, it is apparent that this machine may be used to shave the working surface of the gear teeth in a direction parallel to the roll of said teeth in use. The only difference would be the substitution of a tool having a straight cutting edge rather than the cutting ribs 35 illustrated.

While I have illustrated a manual control for feeding the tool 31 into the work, it will be obvious that automatic means may be provided to feed the tool 31 a predetermined amount upon each reciprocation of the rack 24. Similarly, while I have shown an eccentric and crank for reciprocating the rack 24, it is obvious that this rack may be reciprocated by any suitable means such for example as a piston operated by fluid pressure.

While I have illustrated and described various preferred embodiments of my invention, it will be apparent to those skilled in the art that various additions, omissions, substitutions and modifications may be made within the scope of my invention, as indicated by the appended claims.

What I claim as my invention is:

1. In a machine of the class described, an adjustable tool carriage for holding a tool rigidly in adjusted position, a support for a gear blank, and means for moving said support with a rolling generating motion relative to said tool, said means comprising a fixed rack, a gear in mesh with said fixed rack, a second rack in mesh with said gear, and means for translating said second rack to cause said gear to roll on said fixed rack.

2. In a machine of the class described, an adjustable tool carriage for holding a tool rigidly in adjusted position, a support for a gear blank, and means for moving said support with a rolling generating motion relative to said tool, said means comprising a fixed rack, a gear in mesh with said fixed rack, a second rack in mesh with said gear, and means for translating said second rack to cause said gear to roll on said fixed rack, said support comprising a shaft coaxial with said gear and rigidly carried thereby.

3. In a machine of the class described, an adjustable tool carriage for holding a tool rigidly in adjusted position, a support for a gear blank, and means for moving said support with a rolling generating motion relative to said tool, said means comprising a fixed rack, a gear in mesh with said fixed rack, a second rack in mesh with said gear, and means for translating said second rack to cause said gear to roll on said fixed rack, said support comprising a shaft coaxial with said gear and rigidly carried thereby, said gear being of substantial axial extent to provide firm guiding means for said support.

4. A machine of the character described comprising a frame, a fixed rack supported by said frame, ways in said frame parallel to said fixed rack, a movable rack guided in said ways, a gear meshing with both of said racks, said gear being of substantial axial extent and being otherwise unsupported, a shaft coaxial with said gear, means on said shaft for mounting a gear blank, and means on said frame for supporting a tool in fixed relation to said frame.

5. A machine of the character described comprising a frame, a fixed rack supported by said frame, ways in said frame parallel to said fixed rack, a movable rack guided in said ways, a gear meshing with both of said racks, said gear being of substantial axial extent and being otherwise unsupported, a shaft coaxial with said gear, means on said shaft for mounting a gear blank, and means on said frame for supporting a tool in fixed relation to said frame, and means for adjusting said tool in a direction parallel to the axes of said fixed rack.

6. A machine of the character described comprising a frame, a fixed rack supported by said frame, ways in said frame parallel to said fixed rack, a movable rack guided in said ways, a gear meshing with both of said racks, said gear being of substantial axial extent and being otherwise unsupported, a shaft coaxial with said gear, means on said shaft for mounting a gear blank, means for adjusting the spacing of said racks to accommodate gears of various sizes, and means on said frame for supporting a tool in fixed relation to said frame.

7. A machine of the character described comprising a frame, a fixed rack supported by said frame, ways in said frame parallel to said fixed rack, a movable rack guided in said ways, a gear meshing with both of said racks, said gear being of substantial axial extent and being otherwise unsupported, a shaft coaxial with said gear, means on said shaft for mounting a gear blank, said means being adjustable to provide clamping said gear blank to said support in different positions to provide for indexing of said gear blank, and means on said frame for supporting a tool in fixed relation to said frame.

8. In a machine of the class described, an adjustable tool carriage for holding a tool rigidly in adjusted position, a support for a gear blank, and means for moving said support with a rolling generating motion relative to said tool, said tool carriage being adjustable in a direction parallel to the direction of roll of said support and gear blank, and means providing for adjustment of said tool toward and away from the path of roll of said support, whereby said tool may be positioned so that its cutting edge conforms to an element of the basic rack of said gear blank, or may be adjusted to a position closer to the path of the axis of said gear blank in order to take a generating cut on the teeth of said gear blank to a smaller diameter than the base circle from which said teeth are generated.

9. A machine for serrating gear teeth comprising a fixed rack, a second rack parallel to said fixed rack and longitudinally slidable relative thereto, a gear received between and guidingly supported solely by said racks, a spindle extending axially from said gear, means on said spindle for supporting a gear blank, a tool carriage adjustable parallel to said racks, and means on said carriage for supporting a multi-bladed serrating tool with a plurality of cutting edges disposed in a position to take parallel cuts in the face of the teeth of the gear blank from top to root thereof.

10. In a machine of the class described, means for supporting and moving a gear blank relative to a stationary tool consisting of a fixed rack, a second rack parallel to said fixed rack and reciprocable parallel thereto, a gear between said racks in mesh with both of said racks, and a work supporting spindle extending axially from said gear.

11. A machine for serrating gear teeth comprising means for rotating and translating a gear blank with a generating motion, means for supporting a multi-bladed serrating cutter in position to engage a tooth of said blank in cutting relation, and means to feed said cutter while said cutter is free of said tooth in a direction to increase the depth of cut to cause said cutter to cut a plurality of parallel slots in the face of said tooth.

12. A machine for serrating gear teeth comprising means for rotating and translating a gear blank with a generating motion, means for supporting a multi-bladed serrating cutter in a position within the trace of the base circle of said blank as said blank is moved and in cutting relation to a tooth of said blank, whereby said cutter may cut parallel serrations in the face of said tooth and extending below the base circle thereof.

13. In a serrating machine, a support for a gear blank, a thin blade, a plurality of parallel cutting ribs carried by said blade, the dimensions of said blade and ribs being such that said blade and ribs may be received in the interdental spaces of said blank, means for supporting said blade with said ribs in cutting relation and generally parallel to a tooth surface of said blank, and means for causing a relative rolling, generating motion between said tooth and said blade.

14. A machine for cutting gear teeth comprising a fixed rack, a second rack parallel to said fixed rack and longitudinally slidable relative thereto, a gear received between and guidingly supported solely by said racks, a spindle extending axially from said gear, means on said spindle for supporting a gear blank, a tool carriage adjustable parallel to said racks, and means on said carriage for supporting an edged cutting tool disposed in a position to take parallel cuts in the face of the teeth of the gear blank from top to root thereof.

ROBERT S. DRUMMOND.